(12) United States Patent
Matschullat

(10) Patent No.: US 8,821,657 B2
(45) Date of Patent: Sep. 2, 2014

(54) METHOD AND DEVICE FOR RECOVERING ENERGY FROM A HOT STRIP BUNDLE

(75) Inventor: Thomas Matschullat, Eckental (DE)

(73) Assignee: Siemens Aktiengesellschaft, Munich (DE)

( * ) Notice: Subject to any disclaimer, the term of this patent is extended or adjusted under 35 U.S.C. 154(b) by 333 days.

(21) Appl. No.: 13/320,711

(22) PCT Filed: Apr. 16, 2010

(86) PCT No.: PCT/EP2010/055039
§ 371 (c)(1),
(2), (4) Date: Nov. 15, 2011

(87) PCT Pub. No.: WO2010/133410
PCT Pub. Date: Nov. 25, 2010

(65) Prior Publication Data
US 2012/0055649 A1    Mar. 8, 2012

(30) Foreign Application Priority Data
May 18, 2009    (EP) ...................................... 09160503

(51) Int. Cl.
*F28D 19/04*    (2006.01)
*B21B 45/00*    (2006.01)
*B21B 45/02*    (2006.01)
*B21B 15/00*    (2006.01)

(52) U.S. Cl.
CPC ............ *B21B 45/00* (2013.01); *B21B 45/0209* (2013.01); *B21B 15/005* (2013.01)
USPC .......................................... 148/601; 266/263

(58) Field of Classification Search
CPC ...... B21B 45/0209; B21B 15/005; C21B 9/10
USPC .................................... 148/601; 266/252, 263
See application file for complete search history.

(56) References Cited

U.S. PATENT DOCUMENTS 7,204,894 B1 *   4/2007   Chase et al. ................... 148/601
2012/0055649 A1  3/2012   Matschullat ....................... 165/7

FOREIGN PATENT DOCUMENTS

CN    1338601 A    3/2002    ................. F24J 3/00
JP    54062109 A    5/1979    ............... C21D 9/54

(Continued)

OTHER PUBLICATIONS

Chinese Office Action, Application No. 201080021880.0, 15 pages, Jun. 5, 2013.

(Continued)

Primary Examiner — Scott Kastler
(74) Attorney, Agent, or Firm — King & Spalding L.L.P.

(57) ABSTRACT

In a device and a method for recovering energy from at least one metal hot strip bundle (B) which has a temperature of more than 200° C. and is produced in a hot rolling mill (H), the at least one hot strip bundle (B) passes through an energy recovery device (3). In order to recover energy, a gaseous medium (G) flows around the at least one hot strip bundle (B) within the energy recovery device (3) such that said hot strip bundle absorbs energy, particularly heat, dissipated by the at least one hot strip bundle (B), thereby providing a technically simple method and a corresponding device for recovering energy, both of which can be used for any kind of hot strip, independently of the further processing thereof. Furthermore, CO2 and energy can be saved.

18 Claims, 1 Drawing Sheet

(56) References Cited

FOREIGN PATENT DOCUMENTS

| | | | | |
|---|---|---|---|---|
| JP | 56116834 A | 9/1981 | ............. | B21B 45/00 |
| JP | 57108224 A | 7/1982 | ............... | C21D 1/26 |
| JP | 1075801 A | 3/1989 | ................ | F22B 1/04 |
| JP | 6475801 A | 3/1989 | ................ | F22B 1/04 |
| RU | 2116147 C1 | 7/1998 | ............. | B21B 45/02 |
| RU | 2292402 C2 | 1/2007 | ............. | B21B 45/02 |
| SU | 1 806 321 A3 | 3/1993 | ................ | F27B 9/00 |
| WO | 2010/133410 A1 | 11/2010 | ............. | B21B 45/00 |

OTHER PUBLICATIONS

International PCT Search Report and Written Opinion, PCT/EP2010/055039, 11 pages, Aug. 13, 2010.

\* cited by examiner

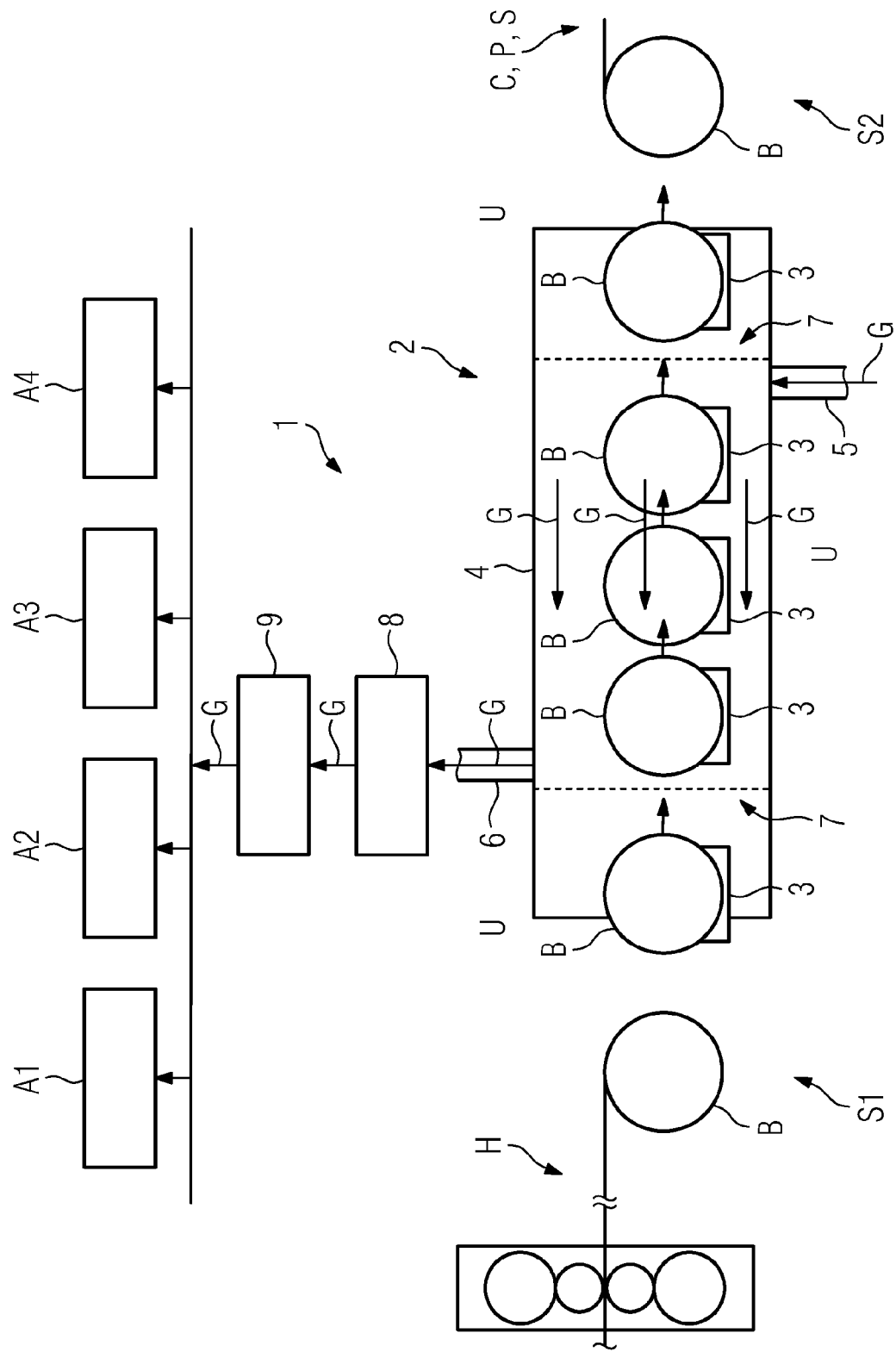

METHOD AND DEVICE FOR RECOVERING ENERGY FROM A HOT STRIP BUNDLE

CROSS-REFERENCE TO RELATED APPLICATIONS

This application is a U.S. National Stage Application of International Application No. PCT/EP2010/055039 filed Apr. 16, 2010, which designates the United States of America, and claims priority to EP Application No. 09160503.0 filed May 18, 2009. The contents of which are hereby incorporated by reference in their entirety.

TECHNICAL FIELD

The invention relates to methods for recovering energy from at least one metallic hot strip bundle which is produced in a hot rolling mill and which has a temperature of more than 200° C., the at least one hot strip bundle being arranged in an energy recovery device. The invention also concerns a device for recovering energy, in particular heat, from at least one metal hot strip bundle produced in a hot rolling mill and having a temperature of more than 200° C., comprising an energy recovery device within which the at least one hot strip bundle can be arranged.

BACKGROUND

In the production of hot rolled metal goods, particularly metal strip, at the end of a production line, particularly a hot-rolled strip line, the hot metal product is collected, usually coiled up.

In the production of hot metal strip, at the end of the hot rolling line, spooling of the rolled hot strip takes place.

This wound or spooled hot metal strip is designated a hot strip bundle.

The thermal energy held by the hot strip bundle is not normally utilized in modern rolling mills. Rather, the hot strip bundles produced are placed in temporary storage pending further processing or delivery, during which the hot strip bundles cool down and release their energy to the environment.

For social and environmental reasons, reduction of the use of resources, and particularly energy, is desirable. It is also desirable to prevent, as far as possible, environmental pollution by hazardous gases, for example $CO_2$. Furthermore, the $CO_2$ emission from an industrial plant is of relevance to an operator of the plant with regard to the requirement for purchase and/or possible sale of emission certificates. A particularly low pollutant emission from an industrial plant compared with competitors can eventually lead to competitive advantages for an operator.

The Japanese unexamined patent application JP 57188683-A discloses an apparatus for the recovery of heat from hot strip existing in the form of a hot strip bundle. According to this prior art, the hot strip is unspooled and fed, in the form of a metal strip through a pickling tank which has heat exchange pipes and is filled with molten salts. In the unwound state, the strip gives heat up to the salt bath and said heat is conducted away through the heat exchange pipes. Water is proposed as the medium for conducting away the heat.

A disadvantage of this procedure according to the prior art is that the heat recovery is technically very complex and so far has not been realized in this way, if at all, at least not to this extent.

SUMMARY

According to various embodiments, a technically simple energy recovery method and a simple device for energy recovery can be provided which are usable for every type of hot strip, regardless of the further processing thereof.

According to an embodiment, in a method for recovering energy from at least one metallic hot strip bundle which is produced in a hot rolling mill and which has a temperature of more than 200° C., the at least one hot strip bundle being arranged at least partially in an energy recovery device, for recovery of energy, a gaseous medium flows around the at least one hot strip bundle within the energy recovery device such that said medium absorbs energy, particularly heat, from the at least one hot strip bundle.

According to a further embodiment, the at least one hot strip bundle can be arranged in an enclosure, particularly a tunnel furnace which is enclosed by the energy recovery device and within which the energy recovery takes place. According to a further embodiment, a hot strip bundle entering the energy recovery device, in particular the enclosure and/or a hot strip bundle exiting the energy recovery device, in particular the enclosure may pass through a lock which reduces the energy exchange, in particular the heat exchange, between the surroundings and the energy recovery device. According to a further embodiment, a plurality of hot strip bundles can be arranged within the enclosure simultaneously. According to a further embodiment, the plurality of hot strip bundles may pass through the enclosure in a first translational direction, the gaseous medium having a flow direction which is essentially contrary to the movement direction of the hot strip bundles. According to a further embodiment, the temperature of the gaseous medium before uptake of the energy, particularly heat, emitted by the at least one hot strip bundle can be essentially room temperature. According to a further embodiment, the temperature of the gaseous medium before uptake of the energy, particularly heat, emitted by the at least one hot strip bundle can be lower than room temperature. According to a further embodiment, the energy recovery can be carried out during transport of the at least one hot strip bundle from a first location to a second location within the industrial plant, the first location being the location of the spooling station of a hot rolling line and the second location being dependent on the further procedure involving the at least one hot strip bundle. According to a further embodiment, the gaseous medium may flow around the at least one hot strip bundle at an adjustable pressure, particularly greater than 1 bar. According to a further embodiment, the gaseous medium enriched with the energy emitted by the at least one hot strip bundle can be compressed and/or stored.

According to another embodiment, a device for recovery of energy, particularly heat, from at least one metal hot strip bundle produced in a hot strip mill and being at a temperature of more than 200° C., comprising an energy recovery device within which the at least one hot strip bundle can be arranged, may be configured such that energy transfer takes place from the at least one hot strip bundle arranged within the energy recovery device to a gaseous medium flowing through the energy recovery device.

According to a further embodiment, the device may comprise a transport device for transporting the at least one hot strip bundle through the energy recovery device. According to a further embodiment of the device, the energy recovery device may comprise an enclosure, in particular a tunnel furnace, through which the at least one hot strip bundle can be transported and within which, preferably during the transporting, the energy recovery takes place. According to a further embodiment of the device, the enclosure may comprise at least one lock for reducing an energy exchange, particularly a heat exchange, between surroundings of the energy recovery device and the energy recovery device during entry and/or exit of at least one hot strip bundle into or out of the enclosure. According to a further embodiment of the device, the enclosure may have an infeed device for the gaseous medium and an extraction device for the gaseous medium, wherein the infeed device and the extraction device are arranged in the first third and the last third of the enclosure and/or between an inlet-side lock and an outlet-side lock of the enclosure. According to a further embodiment of the device, the enclosure can be configured for accommodating a plurality of hot strip bundles. According to a further embodiment of the device, the at least one hot strip bundle which can be arranged within the enclosure can be movable in a first translational direction, the flow of gaseous medium being at least partially adjustable in a direction essentially opposite to the first translational direction. According to a further embodiment of the device, the extraction device can be connected to a compressor for compressing a gaseous medium such that the gaseous medium can be fed from the extraction device to the compressor. According to a further embodiment of the device, the extraction device can be connected to a storage device for storing the gaseous medium such that the gaseous medium can be fed from the extraction device to the storage device.

BRIEF DESCRIPTION OF THE DRAWINGS

Further advantages of the invention are disclosed by the exemplary embodiment which will now be described in greater detail, making reference to the figure.

FIG. 1 shows a schematic representation of the device for recovering energy from a metal strip bundle.

DETAILED DESCRIPTION

The method-related part of this aim 1s achieved with a method of the aforementioned type wherein for recovery of energy, a gaseous medium flows around the at least one hot strip bundle within the energy recovery device such that said medium absorbs energy, particularly heat, from the at least one hot strip bundle. For this purpose, the hot strip bundle does not need to be unspooled—as in the prior art—but can remain in the spooled state. The use of a gaseous medium, particularly air, for heat transfer prevents changes to the surface of the spooled hot strip by a liquid medium. Furthermore, the method according to various embodiments is usable for any hot strip bundle, regardless of the further processing thereof after being subjected to the method according to various embodiments. However, in the prior art, heat recovery takes place only for the hot strip bundles which subsequently pass through a pickling line. The method according to various embodiments therefore solves the above problem.

During energy transfer to the gas, the hot strip bundle can remain static or be moving. In particular, the hot strip bundle can be rotated about the rotational axis thereof during the energy recovery, so that the hot strip bundle gives up energy, particularly heat, to the gaseous medium evenly. It is thereby achieved that narrowly localized contact sites of the hot strip bundle do not come into prolonged contact with a solid body, for example, a transport device such that intense local cooling of the hot strip bundle could occur, leading to inhomogeneities in the hardness of the hot strip bundle to be cooled.

A variety of mechanisms can be used for energy recovery. For example, energy recovery can take place in that the temperature of the gaseous medium is increased by absorption of heat emitted by the at least one hot strip bundle. For example, cold gas is fed to the energy recovery device and hot gas is fed out of the energy recovery device. In such a case, air can preferably be used as the gaseous medium.

Heat recovery can also take place in that the thermal energy emitted by the hot strip bundle is used to carry out a chemical conversion from a first, lower-energy gaseous starting material into a second higher-energy gaseous product.

Subsequently, the gaseous product synthesized by means of the heat emitted from the at least one hot strip bundle can then be further utilized.

Removal of thermal energy from the hot strip bundle can also be carried out by excitation of molecular states in the gaseous medium. For this purpose, gaseous media are to be used, the molecular structures of which have rotational and/or vibrational degrees of freedom. These degrees of freedom contribute to the heat capacity of the gas, such that a higher level of energy transfer per gas molecule than in the case of a pure temperature increase of a monoatomic or diatomic gas is made possible. Such gases are known to persons skilled in the art. A particularly simple, inert gas with a vibrational degree of freedom is, for example, $CO_2$.

The energy transfer mechanisms described above are purely examples. All the energy transfer mechanisms known for gaseous media can be used for the method according to various embodiments, in order to transfer the thermal energy of the hot strip bundle to the gaseous medium.

In an embodiment of the method, the at least one hot strip bundle passes through an enclosure, particularly a tunnel furnace which is enclosed by the energy recovery device and within which the energy recovery takes place. The use of an enclosure is suitable, in particular, where a gaseous medium is used for energy recovery. The enclosure is configured such that at least one hot strip bundle can be fed into or out of the enclosure. Furthermore, said enclosure is preferably configured gas-tight, except for an entry opening and an exit opening for the hot strip bundles. The emergence of the gaseous medium from the energy recovery device is thereby kept as low as possible.

In a further embodiment of the method, a hot strip bundle entering the enclosure and/or a hot strip bundle exiting the enclosure passes through a lock which reduces the heat exchange between the surroundings and the energy recovery device. The heat exchange between the energy recovery device and the surroundings is thus minimized, since the heat locks prevent or reduce the escape of gaseous medium from the enclosure during the introduction or removal of the hot strip bundle to or from the enclosure. The heat lock is therefore configured such that said lock restricts or entirely prevents the emergence of gaseous medium from the enclosure during inward or outward transfer of the hot strip bundle to or from the enclosure. This can be achieved with fluid mechanical means, such as the design of a suitable flow profile or by mechanical means, for example, with suitably closable apertures in the form of doors or flaps.

In a further embodiment of the method, a plurality of hot strip bundles passes through the enclosure simultaneously. By this means, the heat recovery can be performed particularly efficiently, since energy recovery is carried out for a plurality of hot strip bundles simultaneously. This increases the energy absorption of the gaseous medium whilst a larger number of hot strip bundles can be processed. Therefore only one energy recovery device may be needed for a plurality of hot rolling lines.

In a further embodiment of the method, the plurality of hot strip bundles is moved in a first translational direction while passing through the enclosure, the gaseous medium having a flow direction which is essentially contrary to the movement direction of the hot strip bundles. It is thereby achieved that a particular gas volume flows against the whole hot strip bundle and/or a plurality of hot strip bundles in the enclosure and extracts heat therefrom. If the gaseous medium were to flow in the transport direction, then the relative velocity of gas and hot strip bundle would be low, which is disadvantageous for the energy removal by the gas. It is advantageous, in particular, that the lower-energy gaseous medium is fed to a site in the enclosure at which the hot strip bundles have already given up a large amount of the emittable energy thereof and that the higher-energy gaseous medium is conducted to a site out of the enclosure at which the hot strip bundles still have a relatively high thermal energy, particularly temperature. In particular, gas counter-flow and cross-flow methods are advantageous.

Therefore, an essentially anti-parallel arrangement of the movement direction and the flow direction results in particularly efficient energy removal from the hot strip bundles.

In an embodiment of the method, the temperature of the gaseous medium before uptake of the energy, particularly heat, emitted by the at least one hot strip bundle is, in particular, room temperature. In general, this is sufficiently cool in order to achieve a good efficiency level for energy removal from the hot strip bundles. A gaseous medium at room temperature is, particularly technically, very easily provided since said medium can be found in the surroundings of the energy recovery device.

In an embodiment of the method, the temperature of the gaseous medium before uptake of the energy emitted by the hot strip bundles is lower than room temperature. The use of a gaseous medium at a temperature that is lower than room temperature further increases the efficiency of the energy recovery device. This is particularly easy to achieve, without additional energy expenditure, in colder regions of the world, where, for example, by drawing in outside air, a suitable gaseous medium at a temperature of, for example, less than 0° C. can be used. A further filter should possibly be provided before the outside air is fed to the energy recovery device in order to prevent soiling or damage to the hot strip bundles by dirt.

In a further embodiment of the method, the energy recovery is carried out during transport of the at least one hot strip bundle from a first location to a second location within the industrial plant, the first location being the location of the spooling station of a hot rolling line and the second location being dependent on the further procedure involving the at least one hot strip bundle. This means that, for example, each hot strip bundle made on the at least one hot strip line runs first through the energy recovery device before being passed to a possible further process, for example, cold rolling or a pickling process, or being delivered to a customer. In particular, it can thereby be prevented that relatively long additional routes have to be followed to reach the energy recovery device.

In a further embodiment of the method, the gaseous medium enriched with the energy emitted by the at least one hot strip bundle is compressed and/or stored. By this means, the stored hot gaseous medium can be used as combustion air pre-heating or can be used in advantageous manner in a blast furnace in the context of an air blast feed. Alternatively, use of the hot air for energy recovery in the form, for example, of a hot air turbine is also possible. Other devices are possibly also available, in particular, heating devices in which the compressed and/or stored hot air can be used.

In a further embodiment, the gaseous medium flows around the at least one hot strip bundle at an adjustable pressure, particularly greater than 1 bar. By increasing the pressure with an otherwise unchanged flow velocity and at the same gas temperature, the mass of the gas absorbing heat from the hot strip bundle is increased. The efficiency of the heat recovery process is thereby improved, since more heat is transferred to the gas per unit time.

The device-related part of the problem is solved with a device of the aforementioned type, the energy recovery device being so configured that energy transfer takes place from the at least one hot strip bundle arranged within the energy recovery device to a gaseous medium flowing through the energy recovery device. By this means, a device is provided which realizes energy recovery from a hot strip bundle in a particularly simple manner. The hot strip bundle can pass through the energy recovery device during energy recovery or can be arranged stationary therein.

In a further embodiment of the device, said device has a transport device for transporting the at least one hot strip bundle through the energy recovery device. By this means, a continuous process can be realized wherein hot strip bundles are fed to the inlet side of the energy recovery device and continuously passed out of the energy recovery device on the outlet side. In this way, the method can easily be realized in existing hot rolling mills without great technical difficulty and without disrupting successive processes in the industrial plant.

In a further embodiment of the device, the energy recovery device comprises an enclosure, in particular a tunnel furnace, through which the at least one hot strip bundle can be transported and within which, preferably during the transporting, the energy recovery takes place. In that an energy recovery device is realized by means of an enclosure which is configured, in particular, for guiding a gaseous medium, a device can be provided in a particularly simple manner, by means of which the method according to various embodiments can be carried out. Preferably, the energy transfer takes place during transport of the hot strip bundle through the enclosure, so that a minimum of time must be expended in transferring the energy of the hot strip bundle to the gaseous medium.

In a further embodiment of the device, the enclosure comprises at least one lock for reducing an energy exchange, particularly a heat exchange, between surroundings of the energy recovery device and the energy recovery device during entry and/or exit of at least one hot strip bundle into or out of the enclosure. By means of the provision of at least one lock, the energy recovery is particularly efficiently configured, since energy is exchanged between the surroundings and the heat recovery system to only a small extent on entry and/or exit of a hot strip bundle into or out of the enclosure. As a result, the efficiency of the energy recovery process is increased.

In an embodiment of the device, the enclosure has an infeed device for the gaseous medium and an extraction device for the gaseous medium, wherein the infeed device and the extraction device are arranged in the first third and the last third of the enclosure and/or between an inlet-side lock and an outlet-side lock of the enclosure. By this means, it is achieved that the flow path of the gas fed into the energy recovery device is as long as possible, so that an efficient energy exchange between the hot strip bundle and the gaseous medium is enabled. Preferably, the infeed device for the gaseous medium is arranged closer to the outlet-side end of the enclosure than the extraction device. This means that the lower-energy gaseous medium is fed into the enclosure at a site from which said medium flows against the movement direction of the hot strip bundles, toward the hotter hot strip bundles. By this means, a particularly efficient energy exchange is possible. The extraction device is preferably arranged as close as possible to the inlet-side end of the enclosure or as close as possible behind the lock in the transport direction of the hot strip bundles.

In a further embodiment of the device, the enclosure is configured for accommodating a plurality of hot strip bundles. Depending on operation of the hot rolling line, a plurality of hot strip bundles is produced within a relatively short time. In order to configure the energy recovery from said hot strip bundles efficiently, said bundles are fed successively to the enclosure after completion of the spooling procedure, in order to recover energy from said bundles. The enclosure is configured accordingly, i.e. so that a plurality, particularly a large number, of hot strip bundles can pass through the enclosure simultaneously. This has the further advantage that, thanks to the correspondingly large dimensions of the enclosure, the gaseous medium flow therethrough has a longer time available at a given flow speed, to absorb energy from the hot strip bundles.

In a further embodiment of the device, the at least one hot strip bundle, particularly the plurality of hot strip bundles passing through the enclosure together, are movable in a first translational direction, the flow of gaseous medium being at least partially adjustable in a direction essentially opposite to the first translational direction. By this means, it is achieved that the gaseous medium flows from the cooler hot strip bundles to the warmer hot strip bundles. This makes a high level of efficiency possible.

In an embodiment of the device, the extraction device is connected to a compressor for compressing a gaseous medium such that the gaseous medium can be fed from the extraction device to the compressor. By compression of the gas fed out of the energy recovery system, the energy content of the gas, in the particular the temperature thereof, can be further increased. This is particularly advantageous in the re-use of the gaseous medium, e.g. as a hot gas in subsequent processes.

In a further embodiment of the device, the extraction device is connected to a storage device for storing the gaseous medium such that the gaseous medium can be fed from the extraction device to the storage device. By means of the provision of a storage device, it is therefore rendered unnecessary to provide direct use of the extracted gaseous medium. The stored gaseous medium or hot gas can then be re-used when needed in the respective process intended for the use thereof. Operation of the industrial plant to which the hot rolling mill is attached is therefore made more efficient with regard to the energy usage thereof.

The various embodiments therefore permit a more efficient use of energy, so that the input of resources is reduced, as well as enabling the reduction of polluting gases, particularly $CO_2$. the smallest possible production of $CO_2$ being increasingly important in view of trends in environmental economics.

The single figure shows a schematic representation of the device 1 for recovering energy from a metal strip bundle B. The metal strip bundle B is made by means of an also schematically illustrated hot rolling line H.

The metal strip running out of the hot rolling line H is spooled to a hot strip bundle B and then fed to an energy recovery device 2 included in the device 1 for energy recovery.

The energy recovery device 2 comprises an enclosure 4 which, with the exception of a hot strip bundle inlet device and a hot strip bundle outlet device is configured to be gas-tight.

By means of a transport device 3, a hot strip bundle 5 is fed via an inlet-side lock 7 to the enclosure 4. An outlet-side lock 7 through which a hot strip bundle B passes on exiting the enclosure 4 is also present. The enclosure is configured heat-insulated, so that as little energy as possible is emitted via the walls of the enclosure 4 to the surroundings U.

A lock 7 is configured such that an energy exchange, particularly a heat exchange, between a central or middle part of the enclosure 4 and the surroundings U of the enclosure 4 is as low as possible. In particular, the at least one lock 7 is configured such that the escape through the lock 7 of gaseous medium introduced into the enclosure 4 is prevented as far as possible.

The lock can be constructed with at least one suitable mechanical element which has a lock function. Alternatively, the heat lock 7 can be realized, for example, with a gas stream flowing perpendicular to the transport direction of the hot strip bundle introduced into the enclosure 4. The latter variant has the advantage that no mechanical components are able to close and that the risk of a collision of the hot strip bundle B with parts of the enclosure 4, for example, mechanical elements of the lock 7, is reduced, since mechanical parts are dispensed with as far as possible.

Once the hot strip bundle B has passed through the lock 7, a gaseous medium G, for example, air in this case, which flows contrary to the transport direction of the hot strip bundle B, flows around said bundle. In this process, the gas absorbs energy from the hot strip bundle B and is warmed.

Gases other than air which can assume, in particular, excited molecular states (rotation and oscillation of gas molecule components) can also be used, since by this means, a greater quantity of heat can be absorbed from the hot strip bundle per volume of gas.

The air G is fed, by means of an infeed device 5, into the enclosure 4 and, by means of an extraction device 6, out of the enclosure 4 again. The flow of the gas G contrary to the transport direction of a hot strip bundle B is preferably provided by means of a suitably applied pressure gradient in the enclosure 4.

The extraction device is preferably arranged in the transport direction of the hot strip bundles B, behind the input-side lock 7 of the enclosure 4. The infeed device 5 is preferably arranged in the transport direction of the hot strip bundles B before the outlet-side lock 7 of the enclosure 4.

Preferably, the longest possible route, measured in the transport direction, is provided between the infeed device 5 and the extraction device 6, so that with a pre-determined flow speed of the gas G from the infeed device 5 to the extraction device 6, the longest possible contact time of the gas G with the hot strip bundles B is achieved.

According to the figure, the enclosure 4 is configured such that a plurality of hot strip bundles can pass through the enclosure 4 simultaneously and always a plurality of hot strip bundles B can emit energy to the gaseous medium simultaneously. By means of the simultaneous energy recovery from a plurality of hot strip bundles B, the method can be configured particularly efficiently and operated at a high hot strip bundle capacity.

Once a hot strip bundle B has covered the route between the inlet-side lock 7 of the enclosure 4 and the outlet-side lock 7 of the enclosure 4, said bundle passes out of the enclosure 4, by means of the outlet-side lock 7 of the enclosure 4, in an energy-efficient manner. The energy recovery for a hot strip bundle of this type is then complete, since the residual energy content thereof can no longer be economically or usefully recovered.

Subsequently, the hot strip bundle B can be further processed in a variety of processes. For example, possible processes subsequent to the energy recovery are cold rolling C or processing the unspooled metal band in a treatment line P or pickling line or storage S of the hot strip bundle B in a storage place.

Preferably, all the hot strip bundles B made by the hot rolling line H pass through the energy recovery device 2.

According to the present figure, the spooling station of the hot rolling line H represents the first location S1 of the hot strip bundle and the unspooling station or a cold rolling line C or treatment line P represents the second location S2.

The gas G enriched with energy by the hot strip bundle B is fed, by means of the extraction device 6 to a compressor 8. At this point, a hot gas which can be fed to suitable applications in the industrial plant can be created by compression of the gaseous medium.

Through the compression of the gaseous medium enriched with energy, the energy content per unit volume of the gaseous medium is further increased, so that another area of use of the gaseous medium is made possible. However, the compression of the gaseous medium is not necessarily required in order to use said gas in further applications.

The compressed or uncompressed gaseous medium can be stored in a storage device 9, so as to be available to be fed to a suitable process of the industrial plant.

By way of example, the figure shows four processes in the form of the reference signs A1, A2, A3 and A4, which concern, for example, the process of combustion air pre-heating for a hot rolling mill or a power plant, a process of air blast feed for a blast furnace, the use of a compressed or uncompressed gaseous medium in a hot air turbine for energy recovery, or the use of the gaseous medium in auxiliary devices of the blast furnace and of the steel works. For example, the gaseous medium can also be used to heat the industrial plant, particularly the control station of the industrial plant.

It is possible, with the method and the device according to various embodiments, to save and/or recover energy and thereby significantly to improve the $CO_2$ output of an industrial plant.

What is claimed is:

1. A method for recovering enemy from at least one metallic hot strip bundle which is produced in a hot rolling mill and which has a temperature of more than 200° C., the at least one hot strip bundle being arranged at least partially in an energy recovery device configured to use a gaseous medium to recover heat energy from the at least one hot strip bundle for using the recovered heat energy in a subsequent industrial process, the method comprising:
   for recovery of energy, flowing the gaseous medium around the at least one hot strip bundle within the energy recovery device such that said medium absorbs energy from the at least one hot strip bundle,
   wherein the at least one the at least one hot strip bundle is arranged in an enclosure which is enclosed by the energy recovery device and within which the energy recovery takes place, and
   wherein a plurality of hot strip bundles is arranged within the enclosure simultaneously, and the plurality of hot strip bundles passes through the enclosure in a first translational direction, the gaseous medium having a flow direction which is essentially contrary to the movement direction of the hot strip bundles.

2. The method according to claim 1, wherein the enclosure is a tunnel furnace.

3. The method according to claim 1, wherein at least one of a hot strip bundle entering the energy recovery device or the enclosure and a hot strip bundle exiting the energy recovery device or the enclosure passes through a lock which reduces the energy exchange or the heat exchange, between the surroundings and the energy recovery device.

4. The method according to claim 1, wherein the temperature of the gaseous medium before uptake of the energy emitted by the at least one hot strip bundle is essentially room temperature.

5. The method according to claim 1, wherein the temperature of the gaseous medium before uptake of the energy emitted by the at least one hot strip bundle is lower than room temperature.

6. The method according to claim 1, wherein the energy recovery is carried out during transport of the at least one hot strip bundle from a first location to a second location within the industrial plant, the first location being the location of the spooling station of a hot rolling line and the second location being dependent on the further procedure involving the at least one hot strip bundle.

7. The method according to claim 1, wherein the gaseous medium flows around the at least one hot strip bundle at an adjustable pressure.

8. The method according to claim 1, wherein the gaseous medium enriched with the energy emitted by the at least one hot strip bundle is at least one of compressed and stored.

9. A device for recovery of energy from at least one metal hot strip bundle produced in a hot strip mill and being at a temperature of more than 200° C., comprising:
   an energy recovery device within which the at least one hot strip bundle can be arranged, the energy recovery device configured to use a gaseous medium to recover heat energy from the at least one hot strip bundle for using the recovered heat energy in a subsequent industrial process,
   wherein the energy recovery device is configured such that energy transfer takes place from the at least one hot strip bundle arranged within the energy recovery device to the gaseous medium flowing through the energy recovery device, and
   a transport device for transporting the at least one hot strip bundle through the energy recovery device,
   wherein the energy recovery device comprises an enclosure through which the at least one hot strip bundle can be transported and within which the energy recovery takes place during the transporting, and
   wherein the enclosure is configured for accommodating a plurality of hot strip bundles, and wherein the at least one hot strip bundle which can be arranged within the enclosure is movable in a first translational direction, the flow of gaseous medium being at least partially adjustable in a direction essentially opposite to first translational direction.

10. The device according to claim 9, wherein the enclosure is a tunnel furnace.

11. The device according to claim 9, wherein the enclosure comprises at least one lock for reducing an energy exchange or a heat exchange, between surroundings of the energy recovery device and the energy recovery device during at least one of entry and exit of at least one hot strip bundle into or out of the enclosure.

12. The device according to claim 9, wherein the enclosure has an infeed device for the gaseous medium and an extraction device for the gaseous medium, wherein the infeed device and the extraction device are arranged in at least one of the first third and the last third of the enclosure and between an inlet-side lock and an outlet-side lock of the enclosure.

13. The device according to claim 9, wherein the extraction device is connected to a compressor for compressing a gaseous medium such that the gaseous medium can be fed from the extraction device to the compressor.

14. The device according to claim 9, wherein the extraction device is connected to a storage device for storing the gaseous medium such that the gaseous medium can be fed from the extraction device to the storage device.

15. The method according to claim 1, wherein the absorbed energy is heat.

16. The method according to claim 7, wherein the adjustable pressure is greater than 1 bar.

17. A method for recovering energy from at least one metallic hot strip bundle which is produced in a hot rolling mill and which has a temperature of more than 200° C., the at least one hot strip bundle being arranged at least partially in an energy recovery device configured to use a gaseous medium to recover heat energy from the at least one hot strip bundle for using the recovered heat energy in a subsequent industrial process, the method comprising:

transporting the at least one hot strip bundle from a first location of a spooling station of a hot rolling line to a second location for a further procedure involving the at least one hot strip bundle; and for recovery of energy, during the transportation of the at least one hot strip bundle from the first location to the second location, flowing a gaseous medium around the at least one hot strip bundle within the energy recovery device such that said medium absorbs energy from the at least one hot strip bundle.

18. The method according to claim 1, wherein the flow of the gaseous medium has a counter-flow or cross-flow direction with regard to the first translational direction.

\* \* \* \* \*